May 9, 1967 L. KATZMAN ET AL 3,319,046
ELECTRODE AND HEATING CHAMBER FOR VAPORIZERS
Filed June 3, 1964

INVENTOR.
LAWRENCE KATZMAN
BY EDWARD BRIGGIN

Briskin & Goldfarb
ATTORNEYS

United States Patent Office 3,319,046
Patented May 9, 1967

3,319,046
ELECTRODE AND HEATING CHAMBER FOR VAPORIZERS
Lawrence Katzman, New York, and Edward Briggin, Brooklyn, N.Y., assignors to Kaz Manufacturing Co., Inc., New York, N.Y., a corporation of New York
Filed June 3, 1964, Ser. No. 372,349
6 Claims. (Cl. 219—275)

This invention relates to electric steam vaporizers and more particularly to the electrodes and heating chambers therefor.

In the past electrical steam vaporizers have been produced which employ a pair of spaced electrodes mounted in a heating chamber for heating water and converting the water into steam. The heating chamber is for the purpose of substantially instantaneously heating the water to change the water into steam and is arranged so that the water in the main container can flow into the heating chamber to maintain the level of the heating chamber as the steam is being produced. One of the main drawbacks of this arrangement is that in the production of steam, the water is heated to such an extent that if agitated and very often water droplets are formed which render the vaporizer somewhat less effective. This is because the droplets may produce an undue amount of condensation of various parts of the vaporizer and therefore may inhibit the production or delivery of steam for steam inhalation therapy.

It is therefore one of the important objects of the present invention to provide a vaporizer having the electrode assembly and heating chamber thereof so arranged that the hot water and steam mixture is so circulated that there is provided a return path for water droplets, while providing for a most effective manner of formation and delivery of the steam.

Another object of the invention resides in the provision of a vaporizer having an electrode assembly including a relatively small porcelain mounting member and relatively long carbon electrodes suspended from the mounting member. In the past, relatively long and deep porcelain mounting members were necessitated when carbon electrodes were used to protect these electrodes against damage and deterioration. However, in accordance with the concenpts of this invention, there is provided a novel heating chamber having a configuration whereby the water therein is not only heated much more quickly, but wherein the amount of agitated water is not sufficient to cause by its force any breakage of the carbon electrodes, even though they are free of any ancillary support for more than half of their length.

A further object of the present invention resides in the provision of a vaporizer which is arranged whereby the entire cap, heating chamber and electrode assembly can be removed simultaneously in a simple manner from the container allowing the container to be simply and easily refilled.

Still further objects and features of this invention reside in the provision of a vaporizer that is capable of being manufactured in large quantities out of readily available material, which employs synthetic plastic materials having greater insulative qualities for most of the parts thereof.

These, together with the various ancillary objects and features of the invention, which will become apparent as the following description proceeds, are attained by this vaporizer, preferred embodiments of which have been illustrated in the accompanying drawings, by way of Example only wherein.

Figure 1:
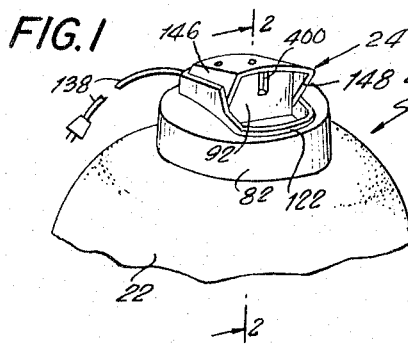
FIG. 1 is a partial perspective view of a vaporizer constructed in accordance with the present invention.

With continuing reference to the accompanying drawings wherein like reference numerals designate similar parts throughout the various views, reference numeral 20 generally designates the electric steam vaporizer comprising the present invention. This vaporizer is constructed out of four major parts which include a jar or container 22 of desired shape and which is preferably blow-molded from linear polyethylene.

In addition to the jar 22 there is provided a cap assembly 24 formed of a suitable phenolic resin material such as a heat resistant bakelite, an instantaneous heating chamber generally indicated at 26 and formed of nylon. There is also provided an electrode assembly 28 including an insulating mounting member 30 and a pair of carbon electrodes 32 and 34. The container 22 is formed in any suitable shape and the jar is provided with a neck preferably provided with a peripheral flange 38 at the upper edge thereof.

The instantaneous heating chamber 26 has a bottom wall 40 provided with an opening or openings 42 therein. The chamber 26 has an enlarged upper portion 45 and a restricted lower portion 47 totally offset from one side of the enlarged portion 45. The restricted lower portion 47 has one wall portion lying flush with the enlarged portion 45. A closure wall 43 having apertures 41 therein joins the two portions together. At the open end 44 of the upper portion 45 there is a peripheral flange 46 having a plurality of apertures 48 therethrough. Screw-type fasteners 50 are adapted to extend through the apertures 46 for securement in suitable threaded recesses 52 in the cap assembly 24 so that the instantaneous heating chamber 26 is held in fixed relationship to the cap, whereby upon removal of the cap, the heating chamber 26 is also removed therefrom.

The electrode assembly 28 is so arranged that the insulating body 30 which is formed of porcelain is of a general rectangular cross section provided with recesses 70 and 72 opening into the bottom 56 of the mounting member 30 and embedded in the upper portions of the electrodes 32 and 34 are metallic studs 74 and 76 formed of brass or other corrosion resistant conductive metal which are externally threaded. The studs 74 and 76 extend through and above the mounting member 30 and threaded nuts 78 and 80 are threadedly engaged on the studs while clampingly holding the electrodes 32 and 34 in place. The threaded studs are adapted to be further secured to the cap assembly 24. The electrodes 32 and 34 are formed of carbon and the largest portion of their length by far is unsupported, only the ends extending into recesses 70 and 72. It has never before been possible to employ such lengths of unsupported carbon electrodes, but the use of the novel heating chamber 26 with its droplet outlets permits such construction.

The cap assembly is formed in two parts including a main body 82 and a cover 84.

The main body 82 has a peripheral side wall 85 which is circular in cross section and adapted to surround the neck 36 of the container 32. Integrally formed with the peripheral wall 85 is an upper wall 86 which is provided with a downwardly extending peripheral flange 86 adapted to surround the peripheral flange 46 of the instantaneous heating chamber 26 when the chamber 26 is secured in place by means of the screws 50 being threadedly engaged in threaded recesses 52. The flange 86 serves to center and seat the instantaneous heating chamber 26.

Integrally formed with the upper wall 85 is a steam chamber 90 bounded by a front wall 92 and a rear wall portion 94 as well as spaced side walls 98. The front wall 92 is provided with a steam dispensing aperture 100 therein with the front wall 92 standing substantially vertically whereby the aperture 100 will form in conjunction with the cover plate 94 hereinafter to be described as a suitable spout for the steam.

The top wall of the steam chamber as indicated at 102 is provided with a recess 104 therein in alignment with the aperture 100. Integrally formed with the upper wall 86 and disposed in spaced relationship of the side walls 98 of the chamber 90 are a pair of spaced walls 106 which define depressions therebetween. The walls 106 have front portions 116 which together with the extension 120 of the forward portion of the peripheral wall 84 define a well 118. Extending above the extension 120 is a flange 122 which further aids in defining the shape of the well 118. The well 118 is adapted to receive suitable medication therein so that steam passing out of the aperture 120 will pick up vapors from the medication in the well 118 for providing steam inhalation thereby to the person using the vaporizer.

The main body 82 is further provided with a pair of openings 126 therein through which the threaded studs 74 and 76 extend which studs are held in place by suitable nuts 130. The nuts 130 also hold in place connectors 134 attached to the wire cord 138 and which pass through a resilient grommet 140 or the like fitting which is held in place between the cover 84 and the main body 82.

Figure 2:
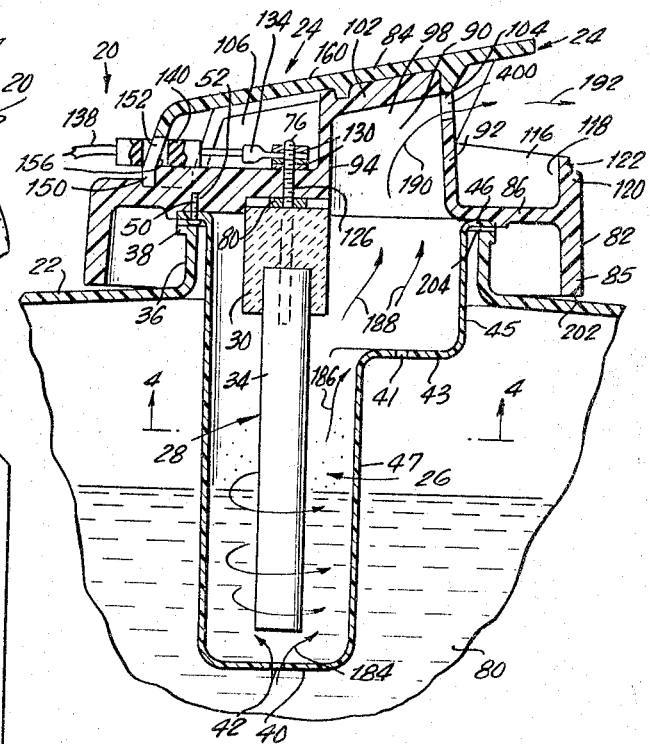
FIG. 2 is a vertical sectional view taken along the plane of line 2—2 in FIG. 1 illustrating the electrodes and heating chamber in particular.
Figure 3:
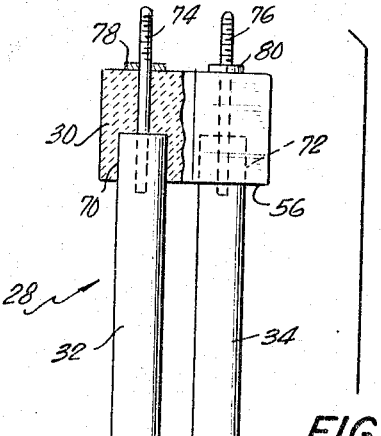
FIG. 3 is an enlarged exploded elevational view of the electrodes and heating chamber, showing parts thereof in section for greater detail.
Figure 4:
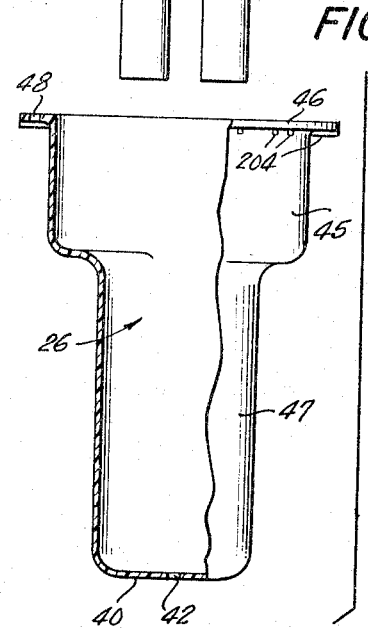
FIG. 4 is a horizontal sectional view taken along the plane of line 4—4 in FIG. 2, with a portion being broken away showing another part in section.
Figure 4:
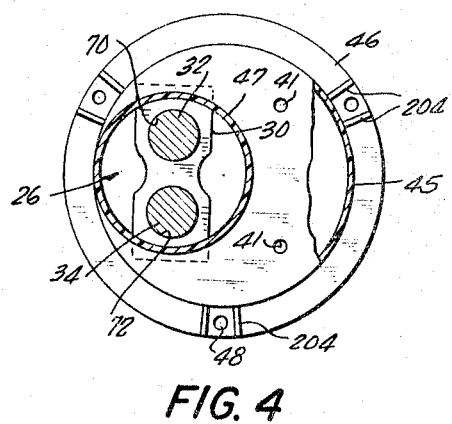

The cover 84 is provided with a pair of spaced downwardly extending flanges 146 and 148 which are adapted to extend into the depressions 110 and 112. Further, the cover 84 is provided with a rear wall 150 having a recess 152 therein so arranged that the portions on either side of the recess 152 of the rear wall 150 will lock in an annular groove 156 formed in the fitting 140 as can best be seen in FIG. 2 holding the fittings in position and serving to safeguard the device should there be any strain on the electric cord 138. The cover 84 is provided with an angularly upwardly extending cover plate 160.

When the entire device is assembled, it will be noted that the electrode assembly 28 is disposed with the mounting member 30 within the enlarged portion 45 of the heating chamber 26 while the electrodes are spaced from the walls of restricted portion 47 of the instantaneous heating chamber. Fluid 180 which is disposed within the container 22 rises to the same level in the instantaneous heating chamber 26 due to the fact that it passes through the openings 42 therein in the direction indicated by arrows 184. This level is always below the closure wall 43 having droplet apertures 41 therein. The electrodes extend almost to the bottom of the chamber 26. With the electrodes 32 and 34 connected to a source of electrical power through the cord 138, water between the electrodes is heated and immediately passes out of the openings 66. The heated water which is in the form of steam and droplets of water will be directed upward into the enlarged portion 45 of the instantaneous heating chamber 26 whereby any droplets of water will fall through apertures 41 back into the solution 180 while the steam itself will pass upwardly from the container in the direction indicated by arrows 186, 188, 190 and 192 and through the steam chamber 90 out of the aperture 100. Since the cover plate 160 has a portion overlying as at 200, the well 118, there will be formed in effect a spout and the steam will be directed to pass over the well 118 and the medication therein whereby the steam will pick up some of the medication for providing steam inhalation therapy to the patient.

It is known that in the assembly of the invention, the flange 46 of the instantaneous heating chamber 26 rests on the peripheral flange 38 of the neck 36 whereby the cap 24 is spaced above the container so as to form a peripheral air inlet 202 so that air may pass through the ribbed opening 204 from the ribs 47 between the flange 46 and the flange 38, then into the container 22 to provide air for taking up the space of the water which has been boiled off into steam. A vacuum is prevented from occurring in this manner. Thus, there will be only steam in the steam chamber 190 and there will not be any droplets of water which can be split out whatsoever. The apertures 41 provide for a positive elimination of any droplets of water. In addition, the entire assembly of the cap assembly 20, the instantaneous heating chamber 26, and the electrodes 28 can be removed from the container 22 simultaneously.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the invention herein.

We claim:

1. A vaporizer comprising a container having a neck, a cap positioned on said container and including a body having a peripheral side wall surrounding said neck of said container said cap being provided with steam outlet means, said body further including an upper wall provided with a downwardly extending cylindrical rim on the under surface thereof, a heating chamber secured to said upper wall centrally of said rim, said heating chamber extending into said container, said heating chamber including an upper substantially cylindrical portion and a lower restricted portion of considerably lesser diameter than cylindrical portion, said restricted portion being offset from cylindrical portion and having portions thereof extending flush with said cylindrical portion, said steam outlet means being offset from said restricted portion, said cylindrical portion having a closure wall defining the lowermost portion thereof, a bottom at the lowermost end of said restricted portion, said bottom having a liquid intake opening therein, said closure wall having at least one droplet outlet aperture therein, an electrode assembly suspended from said cap and extending into said heating chamber and downwardly substantially the entire length of said restricted portion, and means for connecting said electrode assembly to a source of electrical power.

2. A vaporizer comprising a container having a neck, a cap positioned on said container and including a body having a peripheral side wall surrounding said neck of said container said cap being provided with steam outlet means, said body further including an upper wall provided with a downwardly extending cylindrical rim on the undersurface thereof, a heating chamber secured to said upper wall centrally of said rim, said heating chamber extending into said container, said heating chamber including an upper substantially cylindrical portion and a lower restricted portion of considerably lesser diameter than cylindrical portion, said restricted portion being offset from cylindrical portion and having portions thereof extending flush with said cylindrical portion, said steam outlet means being offset from said restricted portion, said cylindrical portion having a closure wall defining the lowermost portion thereof, a bottom at the lowermost end of said restricted portion, said bottom having a liquid intake opening therein, said closure wall having at least one droplet outlet aperture therein, and an electrode assembly suspended from said cap and extending into said heating chamber and downwardly substantially the entire length of said restricted portion, said electrode assembly vaporizer including a mounting member of insulating material, said mounting member having a pair of substantially vertically extending recesses therein opening into the bottom of said mounting member, spaced carbon electrodes mounted in said recess and extending below said mounting member more than twice the depth of said mounting member, means for connecting said electrodes to a source of electrical power, threaded studs embedded in said electrodes and extending through the top of said mounting member, and threaded locking means on said studs engaging said mounting member and clampingly holding said electrodes in said recesses.

3. A vaporizer comprising a container, a cap positioned on said container, said cap being provided with steam outlet means, a heating chamber suspended from said cap, said heating chamber including an upper substantially cylindrical portion and a lower restricted portion of considerably less diameter than said cylindrical portion, said restricted portion being offset from said cylindrical portion, said cylindrical portion having a closure wall defining the lowermost portion thereof, a bottom at the lowermost end of said restricted portion, said steam outlet means being offset from said restricted portion, said bottom having openings therein for permitting fluid in said container to pass into said chamber, said closure wall having droplet apertures therein considerably spaced above said openings to permit droplets to pass out of said chamber, an electrode assembly suspended from said cap and extending into said chamber, said electrode assembly including a mounting member of insulating material, said mounting member having a pair of substantially vertically extending recesses therein opening into the bottom of said mounting member, spaced carbon electrodes mounted in said recess and extending below said mounting member more than twice the depth of said mounting member, threaded studs embedded in said electrodes and extending through the top of said mounting member, threaded locking means on said studs engaging said mounting member and clampingly holding said electrodes in said recesses and means for connecting said electrodes to a source of electrical power.

4. A vaporizer according to claim 3, including steam collecting means in said cap communicating with said chamber, said cap having a spout opening therein communicating with said steam collecting means, said cap, said heating chamber and said electrode assembly being simultaneously removable from said container.

5. A vaporizer comprising a container having a neck, a cap positioned on said container and including a body having a peripheral side wall surrounding said neck of said container, said body further including an upper wall provided with a downwardly extending cylindrical rim on the under surface thereof, a heating chamber secured to said upper wall centrally of said rim, said heating chamber extending into said container, said heating chamber including an upper substantially cylindrical portion and a lower restricted portion of considerably lesser diameter than cylindrical portion, said restricted portion being offset from cylindrical portion and having portions thereof extending flush with said cylindrical portion, said cylindrical portion having a closure wall defining the lowermost portion thereof, a bottom at the lowermost end of said restricted portion, said bottom having a liquid intake opening therein, said closure wall having at least one droplet outlet aperture therein, an electrode assembly, means suspending said electrode assembly from said cap, said electrode assembly extending into said heating chamber and downwardly substantially the entire length of said restricted portion, said electrode assembly vaporizer including a mounting member of porcelain insulating material, said mounting member having a pair of substantially vertically extending recesses therein opening into the bottom of said mounting member, spaced carbon electrodes mounted in said recess and extending below said mounting member more than twice the depth of said mounting member, threaded studs embedded in said electrodes and extending through the top of said mounting member, and threaded locking means on said studs engaging said mounting member and clampingly holding said electrodes in said recesses, means for connecting said electrodes to a source of electrical power, said upper wall having a steam chamber integrally formed therewith in alignment with said cylindrical portion and being further provided with a well for receiving medication, said well being formed in the upper surface of said upper wall, said upper wall having a substantially vertically extending portion between said well and said steam chamber, said vertically extending portion having an aperture therethrough so that steam passing through said aperture from said steam chamber will pass over medication on said well so that steam from said restricted portion moves only upwardly into said cylindrical portion and thence said steam chamber while droplets fall out of said droplet apertures.

6. A vaporizer according to claim 5, wherein said cap, said heating chamber and said electrode assembly are simultaneously removable from said container.

References Cited by the Examiner

UNITED STATES PATENTS

| 1,452,989 | 4/1923 | Strass | 219—288 |
| 2,076,709 | 4/1937 | Deutsch | 219—275 |
| 2,847,734 | 8/1958 | Tavben | 21—119 |
| 2,885,527 | 5/1959 | Tone et al. | 219—289 |
| 3,098,926 | 7/1963 | Katzman | 219—275 |

FOREIGN PATENTS

| 968,823 | 5/1950 | France. |

ANTHONY BARTIS, *Primary Examiner.*